May 6, 1958 S. G. HARRIS 2,832,989
METHOD OF RECOVERING MEATS OF BIVALVES
Filed May 9, 1956
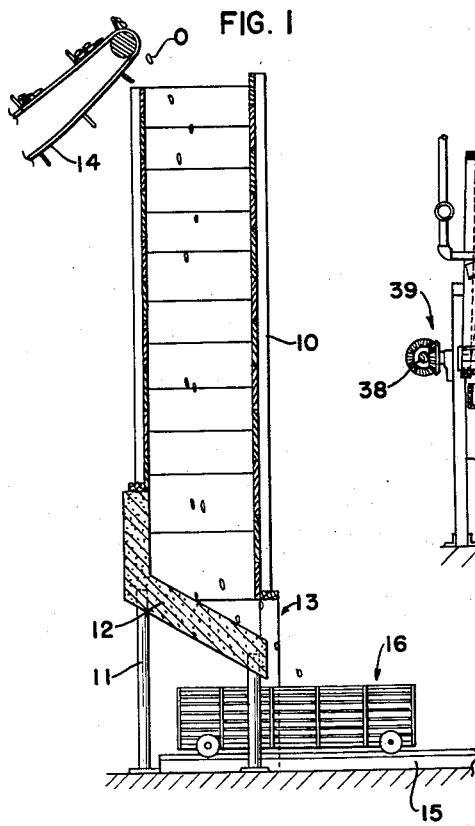
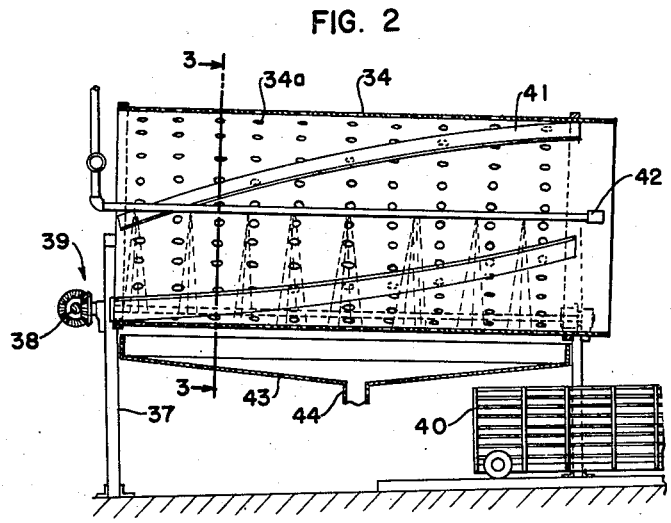
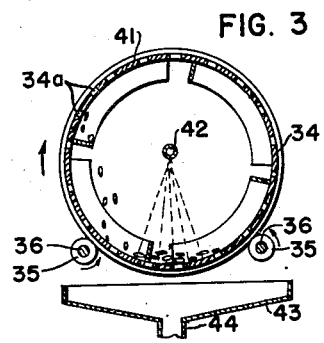
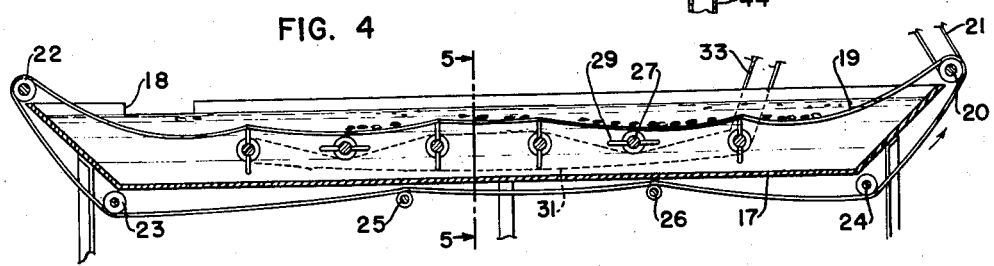
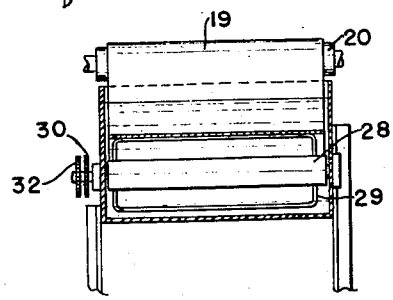
INVENTOR
Sterling G. Harris
BY
Pennie Edmonds Morton Barrows Taylor
ATTORNEYS

United States Patent Office 2,832,989
Patented May 6, 1958

2,832,989

METHOD OF RECOVERING MEATS OF BIVALVES

Sterling Grover Harris, Beaufort, S. C., assignor to Blue Channel Corporation, Port Royal, N. C., a corporation of Maryland Application May 9, 1956, Serial No. 583,880

9 Claims. (Cl. 17—45)

This invention relates to the treatment of edible bivalve molluscs exemplified by oysters, clams, mussels, and scallops and is concerned more particularly with a novel method, by which the meats of the bivalves can be recovered easily and with little damage thereto. The method offers especial advantages when employed in the recovery of oyster meats for shipment in the raw state or for canning and a form of the method applicable to the treatment of oysters will, accordingly, be described in detail for purposes of explanation.

Heretofore, in the canning of oysters, the operations have commonly included washing the oysters, when the shells have dirt adhering thereto, and then cooking the oysters in a steam box or retort to cause the shells to open. When the oysters have cooled sufficiently, the meats have been extracted by shuckers, who use knives to release the adductor muscles of the oysters from the shells. Such manual shucking operations are slow, so that the output of a shucker is small, and, since the shuckers must be paid at least the national minimum hourly rate, the cost of recovering oyster meats for canning by manual shucking is almost prohibitively expensive.

Oyster meats to be sold raw are obtained by manual shucking and, in this case, the shucker must pry open the shells, before he can free the muscles. The opening of the shell of a raw oyster by hand is difficult and laborious and the cost of recovering raw oyster meats is substantially higher than that of recovering the meats of oysters, which have been cooked.

The present invention is, accordingly, directed to the provision of a novel method for the recovery of the meats of edible bivalves from their shells at low cost and with little loss of or damage to the meats. The method may be used to advantage in the treatment of bivalves of various types and is especially useful in the recovery of the meats of oysters, which differ with the locality of their origin in the tenacity with which the adductor muscles adhere to the shells, and include types, in which the recovery of the meats is difficult. While the method varies somewhat, depending upon the bivalve to be treated and whether the meats are to be canned or sold in the raw state, the bivalves are subjected in all applications of the method to a bulk mechanical treatment, in which the bivalves undergo one or more shocks by impact. The shock treatment has the effect of weakening the adhesion of the adductor muscles of the oysters, etc., to the shells and the valves open slightly. The muscles can then be readily released from the shells by hand, if the meats are to be sold raw, or, if the meats are to be canned, the release of the muscles and the separation of the meats from the shells can be effected by a heat treatment followed by mechanical operations.

In addition to the method, the invention includes a novel apparatus for the separation of the meats from the shells of bivalves, which have been subjected to shock followed by heat treatment. The use of the apparatus makes possible the recovery of the meats in a continuous operation with the shells discharged from the apparatus at one place and the meats at another.

For a better understanding of the invention, reference may be made to the accompanying drawings, in which Fig. 1 is a view partly in elevation and partly in vertical section of one form of apparatus, by which the bivalves may be subjected to shock;

Fig. 2 is a view partly in elevation and partly in vertical section of a form of apparatus, in which the bivalves may be simultaneously subjected to shock and washed;

Fig. 3 is a transverse sectional view on the line 3—3 of Fig. 2;

Fig. 4 is a view in longitudinal section of one form of apparatus for separating the meats from the shells of bivalves, which have been subjected to shock and heat treatment; and Fig. 5 is a sectional view on the line 5—5 of Fig. 4.

The use of the apparatus illustrated will be described in connection with the treatment of oysters, but it is to be understood that the same apparatus may be employed in the treatment of other edible bivalve molluscs.

Oysters delivered at the dock from the beds or reefs are sometimes sufficiently clean, so that washing is not required, but, in other cases, the shells have foreign matter adhering thereto and the oysters must be preliminarily washed. Heretofore, the oysters have been commonly washed by passing them through washers, which include a perforated metal drum about 2′ in diameter and mounted for rotation with its axis at a slight angle to the horizontal. A water supply spray pipe extends into the upper end of the drum and, as the drum is slowly rotated, the oysters gradually work their way to the lower end. As they roll upon one another, the water directed upon them washes away the foreign matter.

The cleaned oysters are ready for shucking and, when the meats are to be sold raw, the shucking is done by hand. The shucker uses a strong thick knife, the point of which he inserts between the edges of the two valves and he must sometimes stab at the shells more than once before the knife enters between the valves. After the point of the knife has been inserted, it is manipulated, so that it severs the connections between the muscles and the inner surface of one valve, following which the valves can be separated and the release of the muscles from the other valve effected. Oysters from different localities vary considerably in the tightness with which their shells are held closed by their muscles and in the tenacity with which the muscles adhere to the valves. Also, oysters differ in the form of the edges of the valves remote from the hinge connection. Accordingly, there is a wide variation in the difficulty of shucking oysters, either by hand or by mechanical operations.

I have found that, if the clean oysters are subjected to a sufficient shock by mechanical impact, the adductor muscles are weakened or otherwise affected, so that the valves separate slightly. While the intensity of the shock required for the purpose varies somewhat with the oysters being treated, an adequate shock will cause the valves to separate, so that the natural liquor within the shell will exude at the separated edges of the valves. The application of the shock in no way injures the meats, but has the effect mentioned on the muscles and also seems to weaken the hinge ligament, so that subsequent opening of the shells is facilitated. The shocks, to which the oysters are subjected, should not be so severe as to smash or damage the shell, but it is possible in a number of ways to obtaain the beneficial effect of shocking without injury to the meat or damage to the shells.

The apparatus shown in Fig. 1 provides one simple and convenient means for subjecting the oysters to the shock treatment described. The apparatus includes a hollow tower 10, which may be made of wood boards carried by suitable upright members 11. The lower end of the tower is closed by a bottom 12 having an inclined top surface and conveniently formed of a cast concrete slab and the tower has an opening 13 leading through the side wall above the lower edge of the bottom. The top of the tower is open and it receives oysters indicated at O fed into the top of the tower. A convenient means for feeding the oysters to the tower includes a belt conveyor 14, which extends upward and discharges into the top of the tower. The oysters may be placed upon the conveyor as discharged from the washer or, when the oysters delivered to the dock are sufficiently clean, they may be placed directly upon the conveyor.

A track 15 extends beneath the lower edge of the bottom 12 and the bottom is at an elevation such that a conventional oyster car 16 may be run on the track to a position beneath the opening 13. Such a car is formed with sides and ends made of spaced bars and is in common use in the industry.

In employing the tower, the oysters fed into the top fall by gravity and, as they strike the bottom 12, are subjected to shock and then deflected, so that they pass through the opening 13 and enter the car. The height of the tower used depends on the shock required and this in turn depends on the oysters to be treated, but, ordinarily, a tower of 15' to 20' in height will cause the oysters to be subjected to a shock sufficient to cause the shells to open. The transverse dimensions of the tower are not critical, but it should, of course, be as wide as the conveyor belt 14.

The oysters collected in the car 16 are removed when the car is full and, if the oyster meats are to be sold raw, the oysters are delivered to the shucking tables where the meats are recovered by the usual hand shucking operations. If the oysters are to be canned, they may be given one of a number of different heat treatments to facilitate the recovery of the meats. One such heat treatment or cook is described in my Patent 2,608,716, issued September 2, 1952, and, in carrying out the treatment, a number of cars 16 loaded with oysters are run into a steam box, as illustrated and described in the patent, and the box is closed. Steam is then supplied to the box and the oysters are steamed for a period of 4 to 25 minutes at a temperature in the range from 220° F. to 260° F. at 2½ to 20 lbs. pressure. Ordinarily, cooking for 6 to 10 minutes at 250° F. at 15 lbs. pressure is satisfactory.

Upon completion of the cooking operation, the meats may be recovered from the shells by the use of the separating apparatus described and illustrated in my Patent 2,652,588, issued September 22, 1953. This apparatus includes a rotary drum made up of end rings connected by spaced longitudinal bars or rods. The drum contains lifting baffles, by which the oysters fed into the drum are repeatedly raised and allowed to fall, and, preferably, water jets are directed upon the falling oysters. The shock treatment followed by the cooking operation causes the valves to separate and the adductor muscles to be completely or nearly completely released from the shells. As a result, the repeated lifting and dropping of the oysters in the tumbling drum causes the meats to be quickly removed from the shells and the meats pass between the bars and are collected, while the shells are discharged from the drum at its lower end whereby the shells are segregated from the meats.

Instead of using the tumbling drum of the patent for removing the meats from the oysters, which have been subjected to shock and cooked, the apparatus shown in Fig. 4 may be employed. This apparatus includes a tank 17 having straight sides and sloping ends with an overflow opening 18 in one side wall adjacent one end. A perforated belt 19 encircles the tank vertically and is trained about a pulley 20 driven by any convenient means through a belt 21 and also about an idler pulley 22.

The belt is slack, so that its upper stretch enters the tank, while the lower stretch is trained about idler pulleys 23, 24 and supported on similar pulleys 25, 26. Beneath the belt within the tank are transverse shafts 27 encircled by tubes 28 connected thereto. Each tube carries a pair of beaters 29 made of U-shaped rods attached to the tube 28 to lie in a diametrical plane. The shafts are provided with sprocket wheels 30 lying outside the tank and the wheels are connected together by a chain 31. One of the shafts carries a second sprocket wheel 32 and is driven by any suitable means through a chain 33 trained about sprocket wheel 32.

In the use of the apparatus shown in Figs. 4 and 5, the tank 17 is filled with a brine of sufficient salinity to cause the oyster meats to float while permitting the shells to sink. The oysters, which have been shocked and cooked, are discharged upon the belt 19 near the end remote from the overflow and are carried into the liquid as the belt dips beneath the surface thereof. Some of the meats, which are wholly released from their shells, float free of the shells as soon as the oysters enter the brine, while others, which are not wholly released, are carried into the brine with the shells. As the oysters travel along on the belt, the belt is subjected to agitation from beneath by the action of the beaters 29 striking the belt and, as a result, the shells are caused to bounce up and down beneath the brine. Such continued agitation releases any meats adhering to the shells, so that the meats float away from the shells, while the shells continue on the belt and are carried out and discharged as the belt rises out of the brine. The meats, which float on the brine, travel to the overflow 18, where they pass out of the tank and can be collected in any suitable way. In the operation of the apparatus upon oysters, which have been properly shucked and cooked, a substantially complete recovery of the meats from the shells is obtained with no damage to the meats.

When the oysters as received at the dock require washing, it is possible to combine the washing with the shock treatment by the use of the apparatus shown in Fig. 2. This apparatus comprises a cylindrical metal drum 34, which may be 3'6" to 4' or more in diameter and may be 8' to 10' long. The drum is made of plate stock and it is provided with drainage openings 34a about ¾" in diameter and on 8" to 10" centers. The drum is supported for rotation with its axis inclined to the horizontal on rollers 35 on shafts 36 running in suitable bearings on a framework 37 and the drum may be rotated in any convenient way, as, for example, one of the shafts may be driven from a drive shaft 38 through beveled gearing indicated at 39. The drum is supported at a sufficient height, so that a standard oyster car 40 may be run beneath its lower end. The drum is provided with a number of baffles 41 and the baffles are of sufficient width, such as 4" to 6", so that they can pick up oysters fed into the drum and raise them well toward the top of the drum before permitting them to fall. Four baffles running from end to end of the drum are satisfactory, although other arrangements of the baffles may be employed. Preferably, the baffles are of helical form or inclined to the drum axis, so as to insure that, as the baffles lift the oysters and release them, the oysters will strike the drum at a point lower than the place whence they were raised. As a result, the oysters land upon the drum wall instead of upon other oysters. A water spray pipe 42 extends into the drum and the water washes foreign matter from the surfaces of the oyster shells. The water discharged may be collected in a pan 43 mounted beneath the drum and led off through a pipe 44.

In the operation of the apparatus shown in Figs. 2 and 3, the oysters as landed at the dock are fed into the upper end of the drum 34, while the latter is rotating at a speed such as 10 to 12 revolutions per minute. The oysters are repeatedly raised by the baffles and dropped and they land on the hard surface of the drum, as described. The repeated shocks by impact, to which the oysters are subjected before they leave the drum at the lower end, cause the shells to open slightly, as previously described. At the same time, the foreign matter is washed from the surfaces of the shells. In a washing operation carried on in a conventional washer, the oysters are not subjected to any substantial shock since the washer is of small diameter and has no baffles and the oysters are merely rolled over upon themselves in a mass as they travel from one end of the washer to the other. The ordinary washing operation thus does not produce the shock effect, which can be obtained in the simultaneous washing and dropping of the oysters in the apparatus shown in Fig. 2.

After the oysters have been simultaneously washed and subjected to shock treatment, as described above, the oysters may be shucked by hand, if they are to be sold raw. If the oysters are to be canned, the filled cars are run into the steam box and the oysters are cooked, as above described. Thereafter, the meats are removed from the shells, either in the apparatus of my Patent 2,652,588 or in the apparatus shown in Figs. 4 and 5 hereof.

In practicing the method of the invention on oysters from different areas, variations in the steps of the method may be desirable for best results. Thus, oysters, in which the muscles are tightly adherent to the shell, require more severe shocks than oysters, from which the meats can more easily be recovered. The severity of the shock treatment should be so limited that the oyster shells are not damaged and the cooking should be within the limits of time and temperature above stated.

I claim:

1. A method of recovering the meats from the shells of bivalve molluscs, which comprises subjecting the raw bivalves to mechanical shock sufficient to weaken the adhesion to the shells of the adductor muscles of the bivalves and cause the shells to open, heating the bivalves, after the mechanical shock treatment, to effect at least partial release of the adductor muscles of the bivalves from the valves, and agitating the bivalves after heating to complete the release of the adductor muscles from the valves and to cause removal of the meats from the shells.

2. The method of claim 1, in which the shock is applied to the bivalves by dropping the molluscs from a substantial height and abruptly stopping their fall.

3. The method of claim 1, in which the bivalves are repeatedly raised and dropped with their fall abruptly interrupted while water is directed upon the bivalves to clean the exterior surfaces of their shells.

4. The method of claim 1, in which the heating of the bivalves is effected by exposing the bivalves to steam for 4 to 25 minutes at a temperature ranging from 220° F. to 260° F. and at a pressure ranging from 2½ lbs. to 20 lbs.

5. The method of claim 4 in which the duration of the exposure of the bivalves to the steam is from 6 to 10 minutes and the steam has a temperature of about 250° F. and a pressure of about 15 lbs.

6. The method of claim 1, in which the bivalves, after the shock and heat treatments, are repeatedly raised and dropped, and the meats, as soon as they are removed from the shells, are segregated from contact with the shells.

7. The method of claim 1, in which the bivalves after the shock and heat treatments are lowered into a bath of brine of a salinity sufficient to float the meats, while allowing the shells to sink, and the shells are agitated below the surface of the bath whereby the release of the ends of the adductor muscles from the valves is completed and the meats are removed from the shells.

8. The method of claim 7, in which the bivalves are supported from beneath by a traveling surface, on which they are lowered into the brine bath and are advanced beneath the liquid level of the bath, and in which the bivalves are subjected to localized vibration from beneath at a succession of places while within the bath.

9. The method of claim 1, in which the bivalves, after the mechanical shock and heat treatments, are advanced along a downwardly inclined path and repeatedly raised and dropped to separate the meats from the shells, and the separated meats are moved laterally from the path, as soon as separation of the meats and shells occurs, to segregate the meats from the shells and prevent the meats from being damaged by the shells.

References Cited in the file of this patent

UNITED STATES PATENTS

| | | |
|---|---|---|
| 2,008,820 | Doxsee et al. | July 23, 1935 |
| 2,047,688 | Jenkins | July 14, 1936 |
| 2,102,945 | Doxsee et al. | Dec. 21, 1937 |
| 2,608,716 | Harris | Sept. 2, 1952 |
| 2,652,588 | Harris | Sept. 22, 1953 |

FOREIGN PATENTS

| | | |
|---|---|---|
| 882,428 | France | Mar. 1, 1943 |

UNITED STATES PATENT OFFICE

CERTIFICATE OF CORRECTION

Patent No. 2,832,989                                May 6, 1958

Sterling Grover Harris

It is hereby certified that error appears in the above numbered patent requiring correction and that the said Letters Patent should read as corrected below.

In the grant, lines 2 and 3, address of assignee, for "Port Royal, North Carolina" read -- Port Royal, South Carolina --; in the heading to the printed specification, line 4, for "Port Royal, N. C." read -- Port Royal, S. C. --.

Signed and sealed this 29th day of July 1958.

(SEAL)
Attest:
KARL H. AXLINE
Attesting Officer

ROBERT C. WATSON
Commissioner of Patents